(12) United States Patent
Kwon

(10) Patent No.: US 6,853,567 B2
(45) Date of Patent: Feb. 8, 2005

(54) PUMPING VOLTAGE GENERATOR (75) Inventor: Myeong Ju Kwon, Seoul (KR)

(73) Assignee: Hynix Semiconductor Inc., Gyeonggi-do (KR)

( * ) Notice: Subject to any disclaimer, the term of this patent is extended or adjusted under 35 U.S.C. 154(b) by 0 days.

(21) Appl. No.: 10/608,425

(22) Filed: Jun. 30, 2003

(65) Prior Publication Data
US 2004/0208026 A1 Oct. 21, 2004

(30) Foreign Application Priority Data
Nov. 28, 2002 (KR) ................. 10-2002-0074650

(51) Int. Cl.$^7$ .............................................. H02M 3/18
(52) U.S. Cl. .......................................... 363/60; 363/59
(58) Field of Search ..................... 363/59, 60; 327/530, 327/535, 536

(56) References Cited

U.S. PATENT DOCUMENTS

| | | | |
|---|---|---|---|
| 5,574,634 A | * 11/1996 | Parlour et al. ................. 363/59 |
| 5,847,596 A | 12/1998 | Ryu | |
| 6,122,185 A | * 9/2000 | Utsunomiya et al. ......... 363/60 |
| 6,177,828 B1 | 1/2001 | Kang et al. | |
| 6,333,873 B1 | 12/2001 | Kumanoya et al. | |
| 6,538,936 B2 | 3/2003 | Tanaka et al. | |
| 6,567,309 B2 | * 5/2003 | Tanzawa ................. 365/185.18 |
| 6,724,242 B2 | * 4/2004 | Kim et al. .................... 327/536 |

FOREIGN PATENT DOCUMENTS

| | | |
|---|---|---|
| JP | 10-134571 | 5/1998 |
| JP | 10-337003 | 12/1998 |
| JP | 2000-222878 | 8/2000 |
| JP | 2002-197894 | 7/2002 |

* cited by examiner

Primary Examiner—Matthew V. Nguyen
(74) Attorney, Agent, or Firm—Heller Ehrman White and McAuliffe LLP (57) ABSTRACT The present invention relates to a pumping voltage generator configured to effectively generate a pumping voltage VPP depending on voltage variation. The pumping voltage generator of the present invention comprises a detector, a cycle selecting unit, an oscillator, a control driver and a pumping unit. The detector detects a plurality of pumping voltage levels, and outputs a plurality of enable signals in response to the detected voltage levels. The cycle selecting unit outputs an oscillation cycle selecting signal for controlling an oscillation cycle of a pumping voltage in response to the plurality of enable signals. The oscillator enabled by one of the plurality of enable signals outputs an oscillation signal corresponding to the oscillation cycle selecting signal. The control driver outputs a pumping control signal for controlling the pumping operation in response to the oscillation signal. The pumping unit outputs the pumping voltage in response to the pumping control signal.

14 Claims, 8 Drawing Sheets

PUMPING VOLTAGE GENERATOR

BACKGROUND OF THE INVENTION

1. Field of the Invention

The present invention relates to pumping voltage generators, and more specifically, to a pumping voltage generator configured to perform a proper pumping operation using multiple detection levels, thereby reducing power consumption.

2. Description of the Related Art

Generally, a voltage VPP higher than power voltage of a memory cell array in a DRAM is used to prevent a threshold voltage of a NMOS transistor in a wordline from falling. Particularly, since a low voltage DRAM requires a high voltage due to its speed and characteristics, a circuit for generating a high voltage VPP is required.

Figure 1:
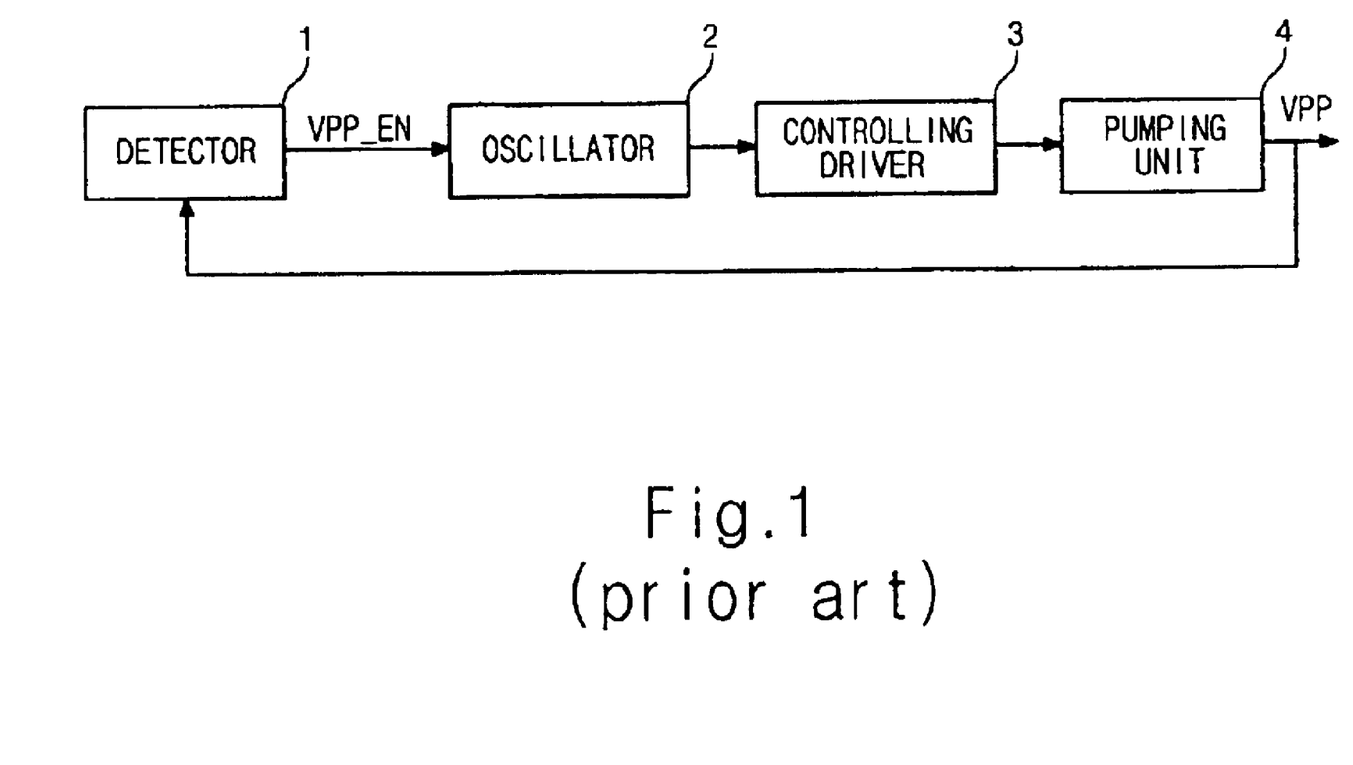
FIG. 1 is a block diagram illustrating a conventional pumping voltage generator.

FIG. 1 is a block diagram illustrating a conventional pumping voltage generator. The conventional pumping voltage generator comprises a detector 1, an oscillator 2, a control driver 3, and a pumping unit 4. The conventional pumping voltage generator has a feed-back structure wherein a pumping voltage VPP outputted from the pumping unit 4 is re-inputted into the detector 1.

The detector 1 detects a potential of the pumping voltage VPP from the pumping unit 4, and outputs a pumping oscillation enable signal VPP_EN in response to the detected potential.

Figure 2:
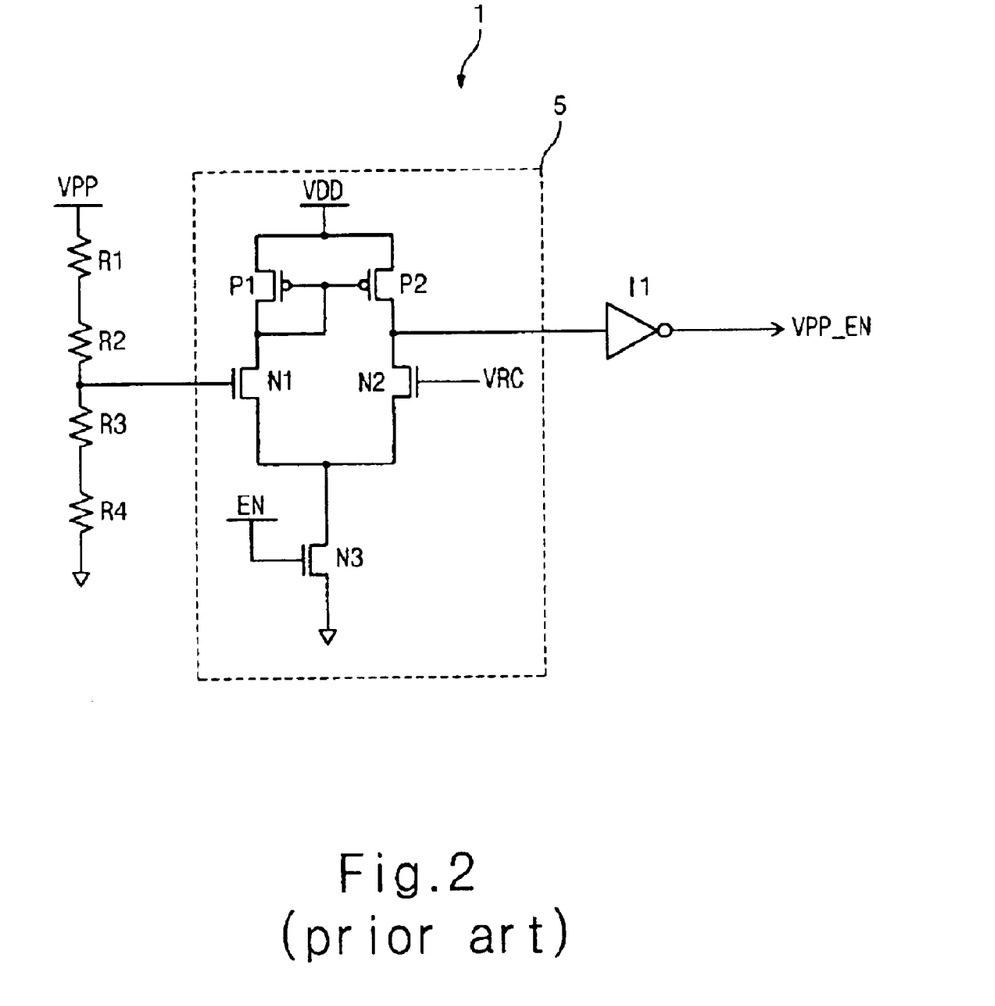
FIG. 2 is a circuit diagram illustrating a detector of FIG. 1.

FIG. 2 is a circuit diagram illustrating the detector 1 of FIG. 1.

Referring to FIG. 2, the detector 1 comprising resistances R1, R2, R3 and R4, and a differential amplifier 5 compares the pumping voltage VPP with a target level. The resistances R1, R2, R3 and R4 connected in series between the pumping voltage VPP and a ground voltage VSS divide a voltage.

The differential amplifier 5 comprises PMOS transistors P1 and P2, NMOS transistors N1, N2 and N3, and an inverter I1. The PMOS transistors P1 and P2 are formed as a current mirror type. The NMOS transistors N1 and N2 amplify a value obtained by comparing a reference voltage VRC with the divided voltage by the resistances R1, R2, R3 and R4, and then output an amplified value. The amplified value is inverted by the inverter I1.

Figure 3:
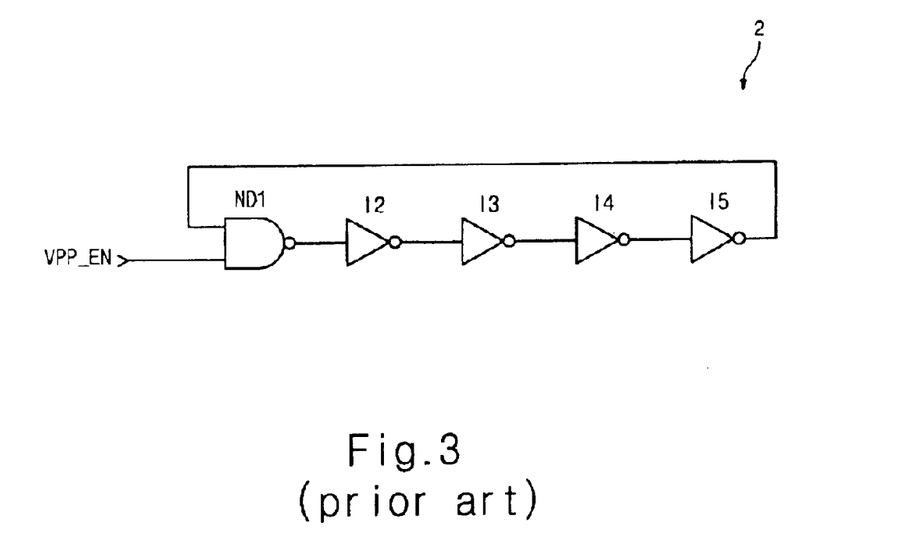
FIG. 3 is a circuit diagram illustrating an oscillator of FIG. 1.

FIG. 3 is a circuit diagram illustrating the oscillator 2 of FIG. 1.

The oscillator 2 periodically outputs a pulse signal for controlling a pumping operation in response to a pumping oscillation enable signal VPP_EN outputted from the detector 1.

As shown in FIG. 3, the oscillator 2 comprises a NAND gate ND1, and inverters I2~I5 connected in series. The oscillator 2 has a feed-back structure wherein an output signal from the inverter 5 is re-inputted into the NAND gate ND1.

The control driver 3 connected to an output terminal to the oscillator 2 outputs a driving control signal depending on the oscillation cycle outputted from the oscillator 2. The pumping unit 4 connected to an output terminal of the control driver 3 pumps charges in response to the control signal outputted from the control driver 3, and then outputs a pumping voltage VPP.

In this way, the conventional pumping voltage generator outputs a pumping voltage by pumping charges according to a predetermined oscillation cycle regardless of the amount of charge consumption.

Figure 4:
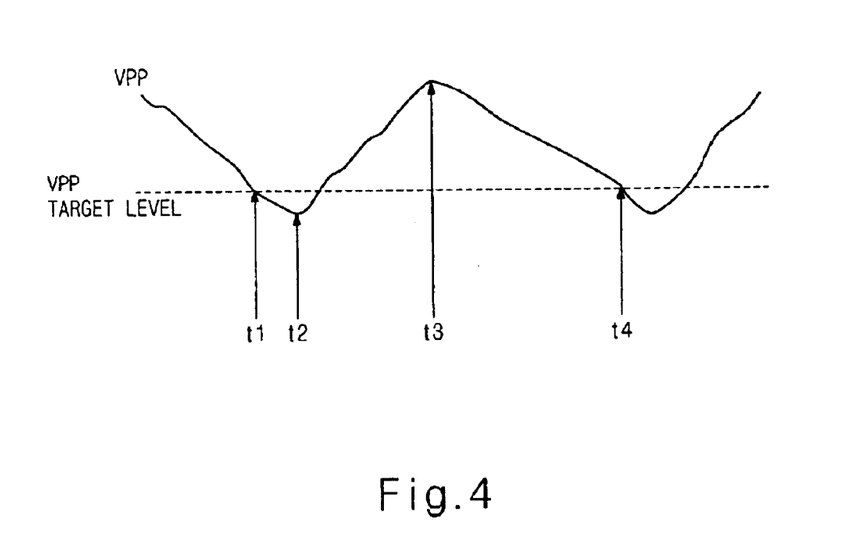
FIG. 4 is a graph showing the operation of the conventional pumping voltage generator.

FIG. 4 is a graph showing the operation of the conventional pumping voltage generator.

Referring to FIG. 4, the pumping voltage VPP shows a sine curve based on the target level. At a time of t1, the detector 1 detects the target level. The period from t1 to t2 is response time after detection of the target level. At a time of t2, the detector 1 detects when the pumping voltage VPP is lower than the target level, and the pumping unit 4 starts pumping charges.

The pumping operation is started from the time of t2, and finished at a time of t3. During the period from t3 to t4, the pumping voltage VPP is dropped by the consumption of charges. As a result, the conventional pumping voltage generator detects the VPP target level to prepare a pumping operation.

As described above, the conventional pumping cycle is regular, and its width is determined to prepare against when charges of the pumping voltage VPP are most consumed. Since the pumping voltage VPP has the different amount of consumed charges depending on various operations such as active or refresh operation, the resultant pumping cycle should vary. However, an oscillation cycle is determined by the largest amount of charge consumption in the conventional pumping voltage generator. As a result, unnecessary power consumption is generated by an excessive pumping operation in most operations. This excessive pumping operation generates noise because the variation width of the pumping voltage VPP becomes large.

SUMMARY OF THE INVENTION

Accordingly, it is an object of the present invention to provide a pumping voltage generator configured to generate a proper pumping voltage VPP depending on the variable amount of charge consumption which is detected using multiple detection levels, thereby reducing power consumption and preventing noise.

The pumping voltage generator of the present invention comprises a detector, a cycle selecting unit, an oscillator, a control driver and a pumping unit. The detector detects a plurality of pumping voltage levels, and outputs a plurality of enable signals in response to the detected voltage levels. The cycle selecting unit outputs an oscillation cycle selecting signal for controlling an oscillation cycle of a pumping voltage in response to the plurality of enable signals. The oscillator enabled by one of the plurality of enable signals outputs an oscillation signal corresponding to the oscillation cycle selecting signal. The control driver outputs a pumping control signal for controlling the pumping operation in response to the oscillation signal. The pumping unit outputs the pumping voltage in response to the pumping control signal.

BRIEF DESCRIPTION OF THE DRAWINGS

FIG. 8b is a circuit diagram illustrating an inverter of FIG. 8a.

DETAILED DESCRIPTION OF THE PREFERRED EMBODIMENTS

The present invention will be described in detail with reference to the accompanying drawings.

Figure 5:
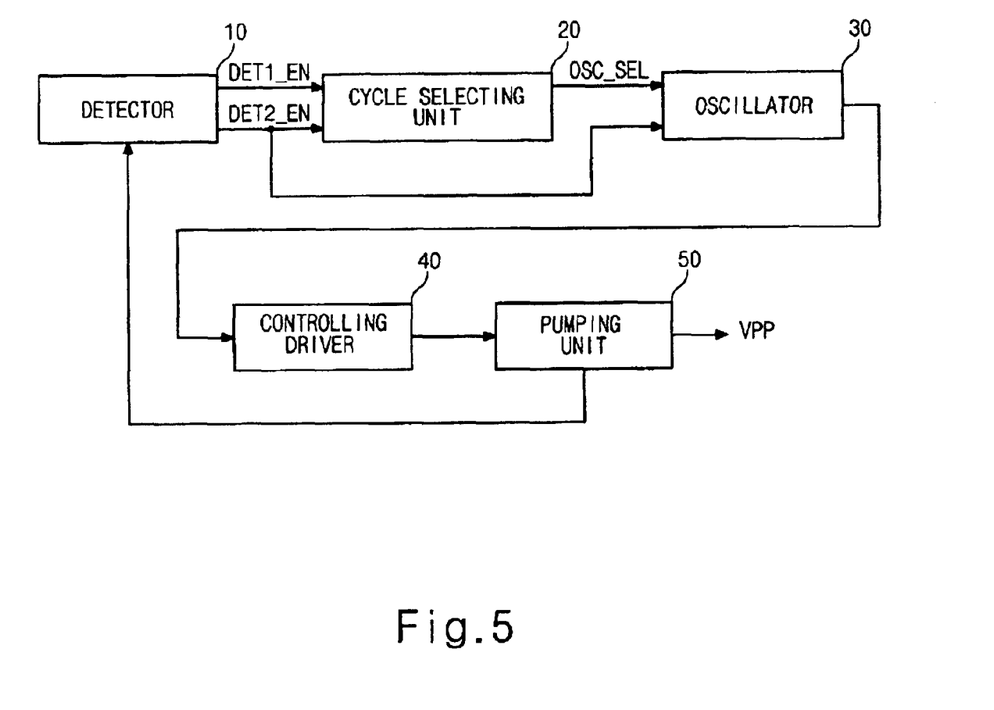
FIG. 5 is a block diagram illustrating a pumping voltage generator according to the present invention.

FIG. 5 is a block diagram illustrating a pumping voltage generator according to the present invention.

The pumping voltage generator of the present invention comprises a detector 10, a cycle selecting unit 20, an oscillator 30, a control driver 40, and a pumping unit 50. The pumping voltage generator has a feed-back structure wherein a pumping voltage VPP outputted from the pumping unit 50 is re-inputted into the detector 10.

The detector 10 detects a potential of the pumping voltage VPP outputted from the pumping unit 50 by two levels. As a result, the detector 10 outputs a pre-detection level enable signal DET1_EN of a high level when the pumping voltage VPP is at a pre-detection level DET1. The detector 10 outputs a pumping voltage target level enable signal DET2_EN of a high level when the pumping voltage VPP is at a pumping voltage target level DET2. Preferably, the pre-detection level DET1 is set higher than the pumping voltage target level DET2.

The cycle selecting unit 20 receives two detection enable signals DET1_EN and DET2_EN from the detector 10, and outputs an oscillation cycle selecting signal OSC_SEL for selecting an oscillation cycle of the pumping unit 50 depending on the amount of charge consumption in the pumping voltage VPP.

The oscillator 30 is enabled by the pumping voltage target level enable signal DET2_EN, and generates an oscillation signal in response to the oscillation cycle selecting signal OSC_SEL outputted from the cycle selecting unit 20. The oscillator 30 receives the oscillation cycle selecting signal OSC_SEL of a low level to output a high frequency oscillation signal when the pumping voltage VPP has the large amount of charge consumption, and the oscillation cycle selecting signal OSC_SEL of a high level to output a low frequency oscillation signal when the pumping voltage VPP has the small amount of charge consumption.

The control driver 40 outputs a control signal for controlling a pumping operation of the pumping unit 50 in response to the oscillation signal outputted from the oscillator 30.

The pumping unit 50 pumps charges of voltage in response to the control signal outputted from the control driver 40, and outputs the pumping voltage VPP.

Hereinafter, the operation of the present invention is described in more details.

If the detector 10 detects that the pumping voltage VPP is at the pre-detection level DET1, the pre-detection level enable signal DET1_EN is enabled. The cycle selecting unit 20 outputs the oscillation cycle selecting signal OSC_SEL of the high level in response to the pre-detection level enable signal DET1_EN. Then, the oscillator 30 enables a low frequency oscillator. As a result, the pumping unit 50 has a slow pumping speed, and pumps a small amount of charges.

On the other hand, if the detector 10 detects that the pumping voltage VPP is at the pumping voltage target level DET2, the pumping voltage target level enable signal DET2_EN is enabled. The cycle selecting unit 20 outputs the oscillation cycle selecting signal OSC_SEL of the low level in response to the pumping voltage target level enable signal DET2_EN. Then, the oscillator 30 enables a high frequency oscillator. As a result, the pumping unit 50 has a rapid pumping speed, and pumps a large amount of charges.

Hereinafter, the detailed structure of the pumping voltage generator of FIG. 5 is described in more details by referring to FIGS. 6 through 8.

Figure 6:
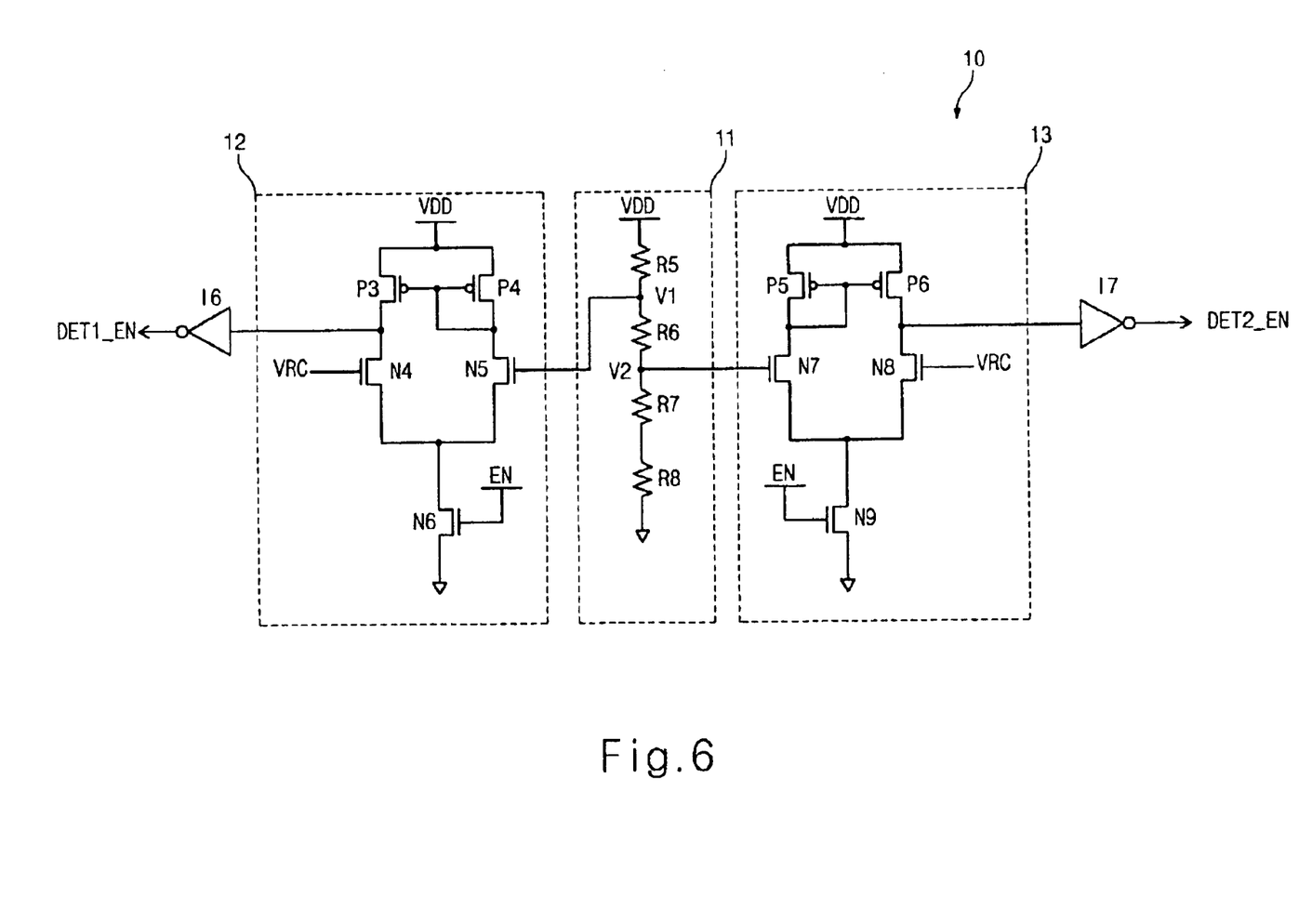
FIG. 6 is a circuit diagram illustrating a detector of FIG. 5.

FIG. 6 is a circuit diagram illustrating the detector 10 of FIG. 5.

The detector 10 of FIG. 6 comprises a voltage divider 11 in the middle, and each differential amplifier unit 12 and 13 in either side of the voltage divider 11. The detection enable signals DET1_EN and DET2_EN is outputted from each differential amplifier unit 12 and 13.

The voltage divider 11 comprises resistances R5, R6, R7 and R8 connected in series between a power voltage VDD and a ground voltage VSS. The voltage divider 11 outputs a predetermined voltage divided by the resistances into each differential amplifier unit 12 and 13. A voltage V1 divided by a node between the resistances R5 and R6 is applied to the differential amplifier unit 12 while a voltage V2 divided by a node between the resistances R6 and R7 is applied to the differential amplifier unit 13. Preferably, the voltage V1 is set higher than the voltage V2. The values of the voltage V1 and V2 may be changed by varying the value of the resistances R5~R8.

The differential amplifier unit 12 comprises PMOS transistors P3 and P4, and NMOS transistors N4, N5 and N6. The PMOS transistors P3 and P4 are formed as a current mirror format. The NMOS transistors N4 and N5 amplify a value obtained by comparing a reference voltage VRC with an output voltage V1 from the voltage divider 11. The NMOS transistor N6 is driven by an enable signal EN.

The differential amplifier unit 13 comprises PMOS transistors P5 and P6, and NMOS transistors N7, N8 and N9. The PMOS transistors P5 and P6 are formed as a current mirror format. The NMOS transistors N7 and N8 amplify a value obtained by comparing the reference voltage with the output voltage V2 from the voltage divider 11. The NMOS transistor N9 is driven by the enable signal EN.

The differential amplifier unit 12 outputs the pre-detection level enable signal DET1_EN of the low level when the divided voltage V1 is higher than the reference voltage VRC. The differential amplifier unit 13 outputs the pumping voltage target level enable signal DET2_EN of the high level when the divided voltage V2 is lower than the reference voltage VRC.

As described above, the logic levels of the pre-detection level enable signal DET1_EN and the pumping voltage target level enable signal DET2_EN are differentiated when a divided voltage is between the voltages V1 and V2. When the divided voltage is higher than the voltage V1 or lower than the voltage V2, the logic levels are the same.

Suppose that the reference voltage VRC is 3V, the voltage V1 is 4V, and the voltage V2 is 2V. The differential amplifier unit 12 compares the voltage V1 of 4V with the reference voltage of 3V. As the voltage V1 is higher than the reference voltage VRC, the differential amplifier unit 12 turns on the NMOS transistor N5 to output the pre-detection level enable signal DET1_EN of the low level. The differential amplifier unit 13 compares the voltage V2 of 2V with the reference voltage of 3V. As the voltage V2 is lower than the reference voltage VRC, the differential amplifier unit 13 turns on the NMOS transistor N8 to output the pumping voltage target level enable signal DET2_EN of the high level.

Figure 7:
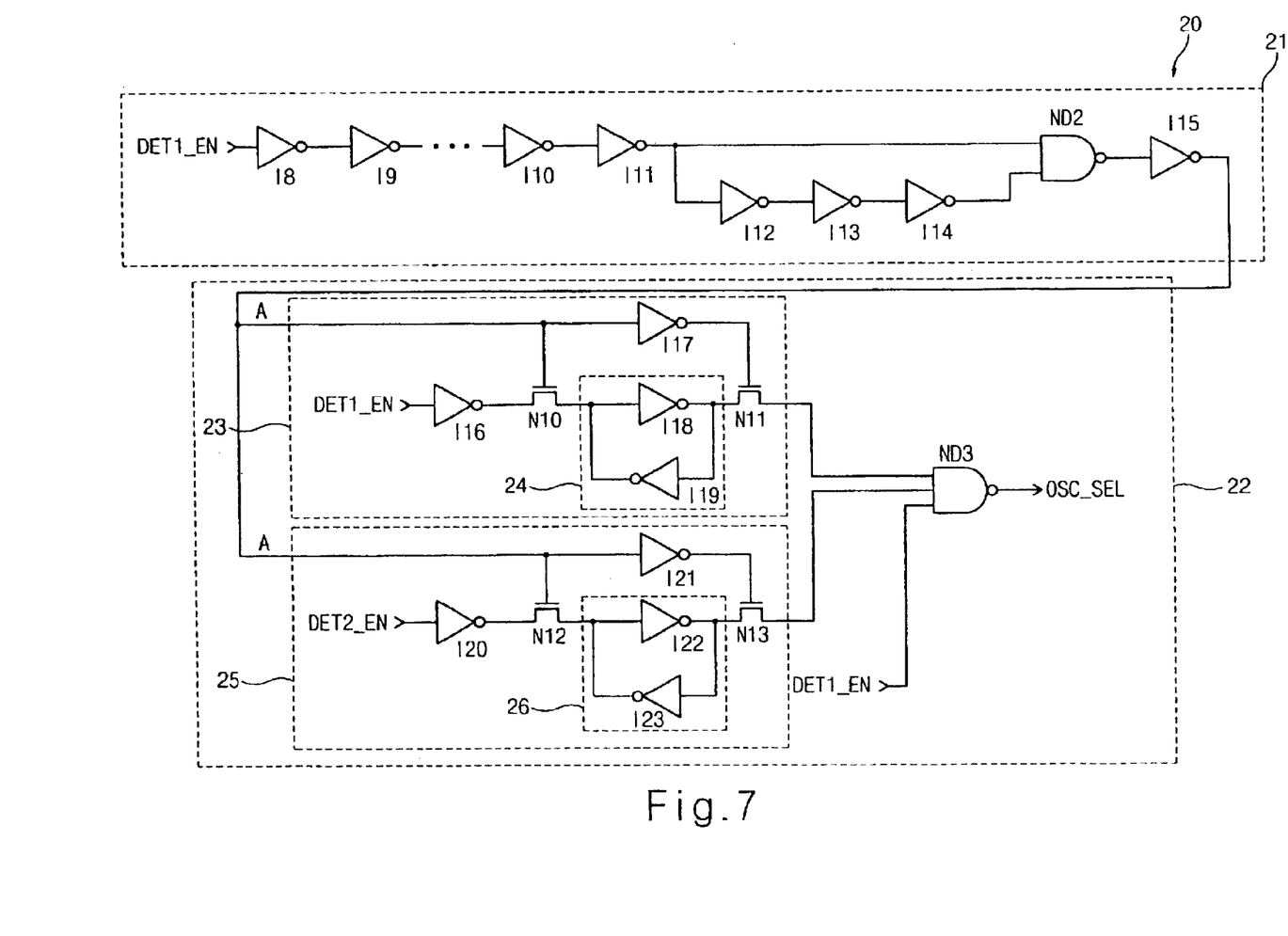
FIG. 7 is a circuit diagram illustrating a cycle selecting unit of FIG. 5.

FIG. 7 is a circuit diagram illustrating the cycle selecting unit 20 of FIG. 5.

The cycle selecting unit 20 of FIG. 7 includes a pulse generator 21 and an oscillation cycle selecting signal output unit 22.

The pulse generator 21 comprising a plurality of inverters I8~I15, and a NAND gate ND2 outputs a pulse A having a predetermined width in response to the pre-detection level enable signal DET1_EN outputted from the detector 10.

The oscillation cycle selecting signal output unit 22 comprises a pre-detection level enable signal input unit 23, a pumping voltage target level enable signal input unit 24, and a NAND gate ND3.

The pre-detection level enable signal input unit 23 comprises inverters I16 and I17, a latch unit 24 including inverters I18 and I19, and NMOS transistors N10 and N11. The inverter I16 inverts the pre-detection level enable signal DET1_EN. The NMOS transistor N10 is controlled by the pulse A. The inverter I17 inverts the pulse A. The NMOS transistor N11 is controlled by an output signal from the inverter I17.

The pumping voltage target level enable signal input unit 25 comprises inverters I20 and I21, a latch unit 26 including inverters I22 and I23, and NMOS transistors N12 and N13. The inverter I20 inverts the pumping voltage target level enable signal DET2_EN. The NMOS transistor N12 is controlled by the pulse A. The inverter I21 inverts the pulse A. The NMOS transistor N13 is controlled by an output signal from the inverter I21.

The NAND gate ND3 performs a NAND operation on output signals from the pre-detection level enable signal input unit 23, the pumping voltage target level enable signal input unit 25 and the pre-detection level enable signal DET1_EN.

The operation of the oscillation cycle selecting signal output unit 22 is described below.

Suppose that the pulse A is at a high level, the pre-detection level enable signal DET1_EN is at the high level, and the pumping voltage target level enable signal DET2_EN is at the low level.

The pre-detection level enable signal input unit 23 turns on the NMOS transistor N10, and latches a low level signal outputted from the inverter I16 in the latch unit 24. When the pulse A is at a low level, the input unit 23 turns on the NMOS transistor N11, and outputs the low level signal latched in the latch unit 24 into the NAND gate ND3.

The pumping voltage target level enable signal input unit 25 turns on the NMOS transistor N12, and latches a high level signal outputted from the inverter I20 in the latch unit 26. When the pulse A is at the low level, the input unit 25 turns on the NMOS transistor N13, and outputs the high level signal latched in the latch unit 26 into the NAND gate ND3.

AS a result, the NAND gate ND3 receives the low level signal outputted from the pre-detection level enable signal input unit 23, the high level signal outputted from the pumping voltage target level enable signal input unit 25, the pre-detection level enable signal DET1_EN of the low level, and outputs the oscillation cycle selecting signal OSC_SEL having the low frequency.

In this way, the low frequency oscillation cycle selecting signal OSC_SEL is outputted when the pre-detection level enable signal DET1_EN is at the high level and the pumping voltage target level enable signal DET2_EN is at the low level. On the other hand, the high frequency oscillation cycle selecting signal OSC_SEL is outputted when the pre-detection level enable signal DET1_EN is at the low level and the pumping voltage target level enable signal DET2_EN is at the high level.

These operations of the pre-detection level enable signal DET1_EN, the pumping voltage target level enable signal DET2_eN and the pulse A will be explained later, referring to FIG. 9.

The oscillation cycle selecting signal output unit 22 outputs the oscillation cycle selecting signal OSC_SEL depending on the states of the pre-detection level enable signal DET1_EN and the pumping voltage target level enable signal DET2_EN in an interval of the pulse A outputted from the pulse generator 21.

Figure 8A:
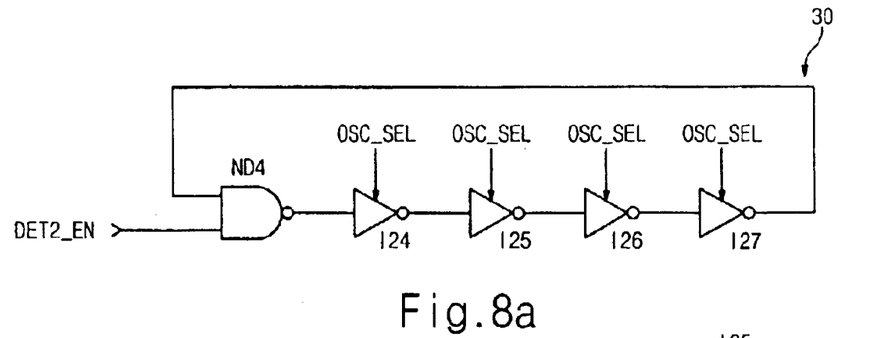
FIG. 8a is a circuit diagram illustrating an oscillator of FIG. 5.
Figure 8B:
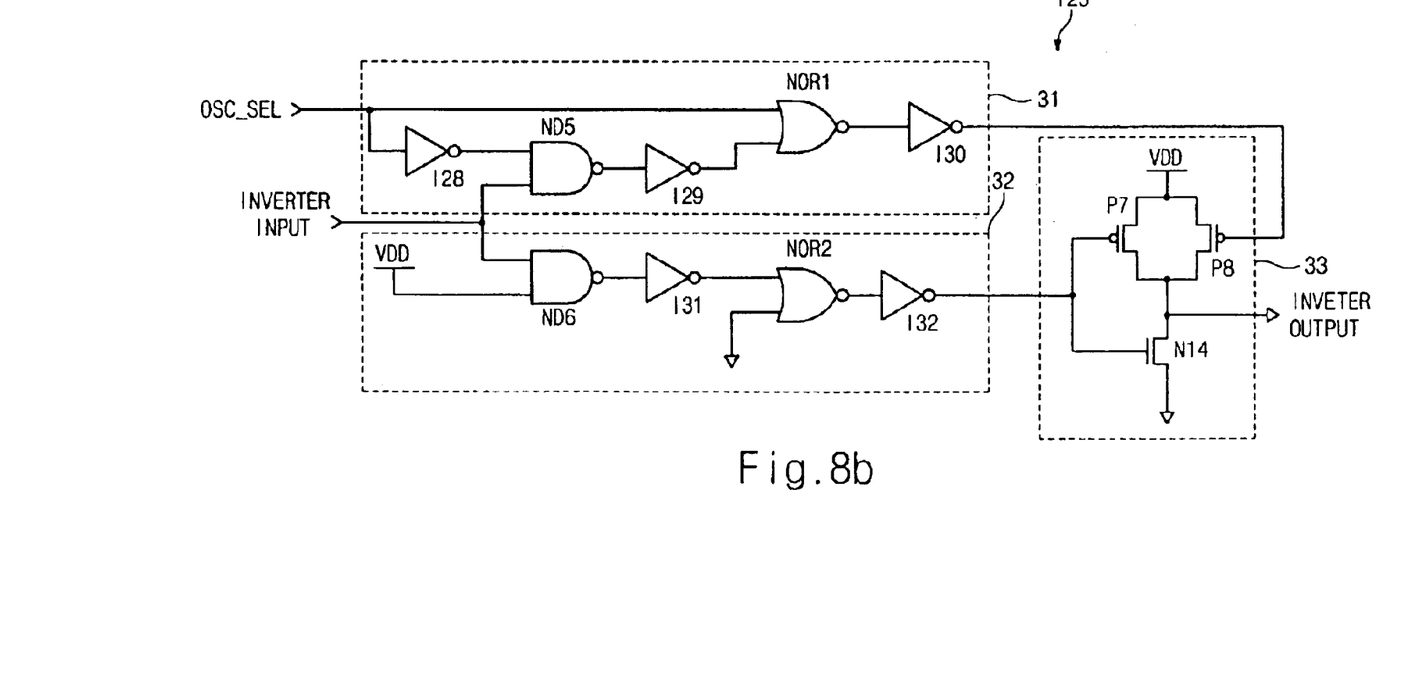

FIGS. 8a and 8b are circuit diagrams illustrating the oscillator 30 of FIG. 5. FIG. 8a is a detailed circuit diagram illustrating the oscillator of FIG. 5 while FIG. 8b is a detailed circuit diagram illustrating the inverter I25 of FIG. 8a.

Referring to FIG. 8a, the oscillator 30 comprises a NAND gate ND4, and a plurality of inverters I24~I27 connected in series. The NAND gate ND4 performs a NAND operation on the pumping voltage target level enable signal DET2_EN and an output signal from the inverter I27, and outputs the NAND operation result. The inverters I24~I27 are controlled by the oscillation cycle selecting signal OSC_SEL, respectively, and an output signal from the previous inverter.

Referring to FIG. 8b, the inverter I25 comprises an oscillation cycle selecting signal input unit 31, an inverter input unit 32, and an inverter output unit 33. The rest inverters I24~I27 have the same structure as that of the inverter I25 shown in FIG. 8b.

The oscillation cycle selecting signal input unit 31 comprises inverters I28, I29 and I30, a NAND gate ND5, and a NOR gate NOR1. The inverter I28 inverts the oscillation cycle selecting signal OSC_SEL. The NAND gate ND5 performs a NAND operation on an output signal from the inverter I28 and an inverter input signal. The inverter I29 inverts an output signal from the NAND gate ND5. The NOR gate NOR1 NORs an output signal from the inverter I29 and the oscillation cycle selecting signal OSC_SEL.

The inverter input unit 32 comprises a NAND gate ND6, inverters I31 and I32, and a NOR gate NOR2. The NAND gate ND6 controlled by a power voltage VDD inverts the inverter input signal. The inverter I31 inverts an output signal from the NAND gate ND6. The NOR gate NOR2 controlled by the ground voltage VSS inverts an output signal from the inverter I31.

The inverter output unit 33 comprises PMOS transistors P7 and P8, and a NMOS transistor N14. The PMOS transistor P8 is controlled by an output signal from the oscillation cycle selecting signal input unit 31. The PMOS transistor P7 is controlled by an output signal from the inverter input unit 32.

When the output signal from the oscillation cycle selecting signal input unit 31 and the inverter input unit 32 are both at the low level, the PMOS transistors P7 and P8 are turned on. As a result, an output signal from the inverter output unit 33 becomes at a high level. When the output signals from the oscillation cycle selecting signal input unit 31 and the inverter input unit 32 are both at the high level, the NMOS transistor N14 is turned on. As a result, the output signal from the inverter output unit 33 becomes at a low level.

In this way, each inverter I24~I27 of the oscillator 30 outputs an oscillation signal determined by the output signal from the previous inverter and the oscillation cycle selecting signal OSC_SEL.

Figure 9:
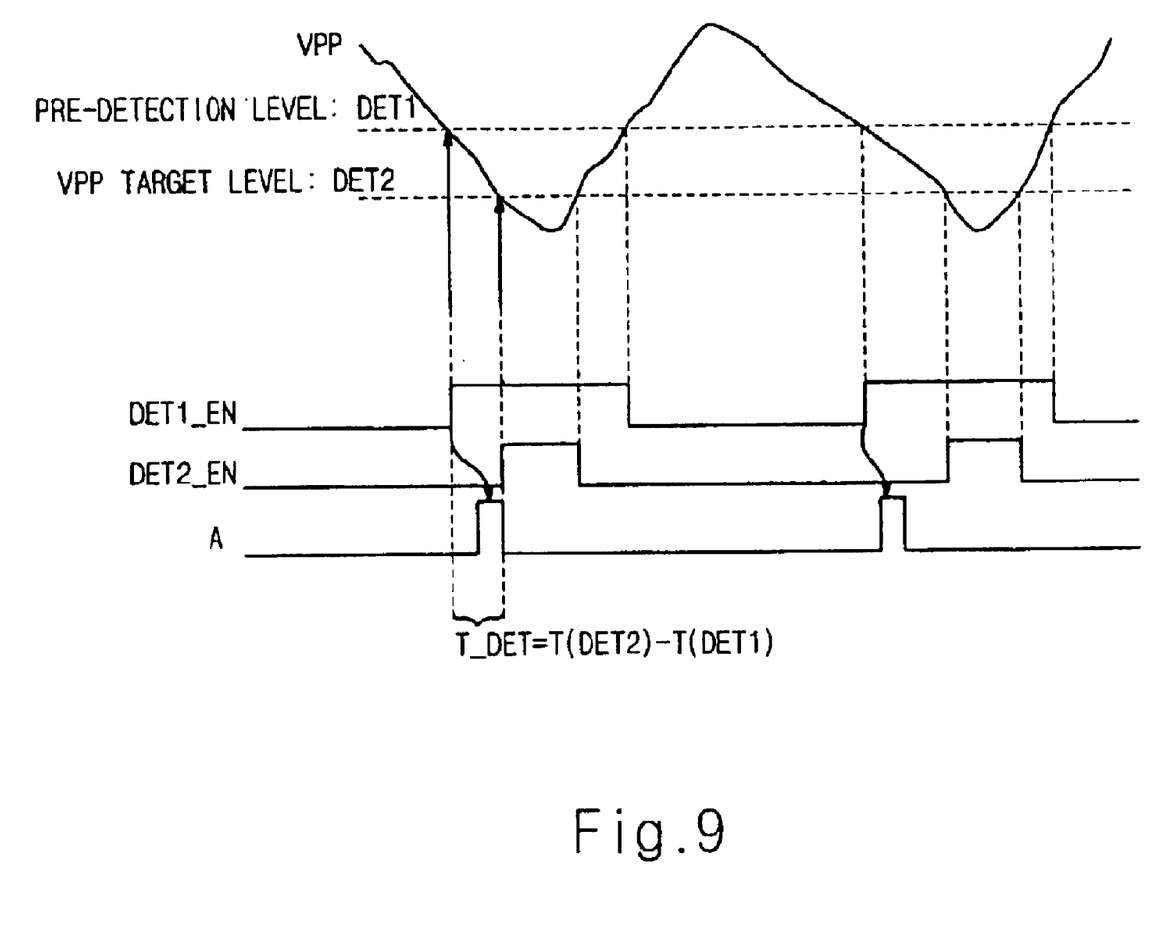
FIG. 9 is a graph and a timing diagram showing the operation of the pumping voltage generator according to the present invention.

FIG. 9 is a graph and a timing diagram showing the operation of the pumping voltage generator according to the present invention.

The pumping voltage VPP has a sine curve based on the pre-detection level DET1 and the pumping voltage level DET2.

If the curve of the pumping voltage VPP rapidly drops from the pre-detection level DET1 to the pumping voltage target level DET2, the amount of charge consumption in the pumping voltage VPP is proved to be large. As a result, a oscillation signal having a rapid oscillation cycle is outputted, thereby performing a rapid charge pumping operation. On the other hand, if the curve of the pumping voltage VPP gently drops from the pre-detection level DET1 to the pumping voltage target level DET2, the amount of charge consumption in the pumping voltage VPP is proved to be small. As a result, a oscillation signal having a slow oscillation cycle is outputted, thereby performing a slow charge pumping operation.

In addition, the amount of charge consumption in the pumping voltage may be obtained by a final time T_DET from activation of the pre-detection level enable signal DET1_EN to activation of the pumping voltage target level enable signal DET2_EN.

The detection time of the pre-detection level DET1 from that of the pumping voltage target level DET2 equals the final time T_DET represented by Equation 1.

$$T\_DET = T(DET2) - T(DET1) \quad \text{[Equation 1]}$$

The amount of charge consumption in the pumping voltage is larger as the final time T_DET is shorter while smaller as it is longer.

As discussed earlier, a pumping voltage generator of the present invention selects an oscillation cycle depending on the amount of charge consumption in a pumping voltage detected by a plurality of pumping voltage detection levels. As a result, a proper pumping operation depending on the amount of charge consumption is performed, thereby reducing power consumption and preventing noise.

What is claimed is:

1. A pumping voltage generator, comprising:
   a detector configured to detect a plurality of pumping voltage levels, and to output a plurality of enable signals in response to the detected voltage levels;
   a cycle selecting unit configured to output an oscillation cycle selecting signal for controlling an oscillation cycle of a pumping voltage in response to the plurality of enable signals;
   an oscillator configured to be enabled by one of the plurality of enable signals, and to output an oscillation signal corresponding to the oscillation cycle selecting signal;
   a control driver configured to output a pumping control signal for controlling the pumping operation in response to the oscillation signal; and
   a pumping unit configured to output the pumping voltage in response to the pumping control signal.

2. The generator of claim 1, wherein the detector comprises:
   a voltage divider configured to connect a plurality of resistances in series between a power voltage and a ground voltage, and to divide a voltage and output the voltage through a first node and a second node among the resistances;
   a first differential amplifier unit configured to compare a reference voltage with an output voltage from the first node, and to output a first enable signal among the plurality of enable signals; and
   a second differential amplifier unit configured to compare the reference voltage with an output voltage from the second node, and to output a second enable signal among the plurality of enable signals.

3. The generator of claim 2, wherein the output voltage of the first node is higher than that of the second node.

4. The generator of claim 1, wherein the cycle selecting unit comprises:
   a pulse generator configured to receive one of the plurality of enable signals, and to output a predetermined pulse; and
   an oscillation cycle selecting signal output unit configured to output the oscillation cycle selecting signal for selecting an oscillation cycle by using the predetermined pulse and the plurality of enable signals.

5. The generator of claim 4, wherein the pulse generator comprises:
   a plurality of inverter chains configured to be connected in series, and to delay one of the plurality of enable signals; and
   a logic means configured to logically operate the enable signal delayed by the inverter chain, and to output the predetermined pulse.

6. The generator of claim 4, wherein the oscillation cycle selecting signal output unit comprises:
   a first enable input means configured to be controlled by the pulse signal, and to receive a first enable signal of the plurality of enable signals;
   a second enable input means configured to be controlled by the pulse signal, and to receive a second enable signal of the plurality of enable signals; and
   a logic means configured to logically operate output signals from the first enable input unit and the second enable input unit with the first enable signal.

7. The generator of claim 6, wherein the first enable input means comprises:
   a first inverter means configured to invert the first enable signal;
   a first transistor means configured to have a drain connected to an output terminal of the first inverter, and to be controlled by the pulse;
   a latch means configured to have one terminal connected to a source of the first transistor, and to latch an output signal from the first inverter;
   a second inverter means configured to invert the pulse; and
   a second transistor means configured to have a drain connected to the other terminal of the latch means and a source connected to an input terminal of the logic means, and to be controlled by an output signal from the second inverter.

8. The generator of claim 6, wherein the second enable input unit comprises:
   a first inverter means configured to invert the first enable signal;
   a first transistor means configured to have a drain connected to an output terminal of the first inverter, and to be controlled by the pulse;

a latch means configured to have one terminal connected to a source of the first transistor, and to latch an output signal from the first inverter;

a second inverter means configured to invert the pulse; and a second transistor means configured to have a drain connected the other terminal of the latch means and a source connected to an input terminal of the logic means, and to be controlled by an output signal from the second inverter.

9. The generator of claim 6, wherein the logic means is a NAND gate.

10. The generator of claim 1, wherein the oscillator comprises:

an inverter chain configured to included a plurality of inverters connected in series, wherein an output signal of each inverter is controlled by the oscillation cycle selecting signal; and a logic operation means configured to logically operate one of the plurality of enable signal with an output signal from the inverter chain, and to output the logic operation result into an input terminal of the inverter chain.

11. The generator of claim 10, wherein an inverter in the inverter chain comprises:

an oscillation cycle selecting signal input unit configured to receive the oscillation cycle selecting signal, to perform a predetermined delay operation and a logic operation on the received signal, and to output the operation result;

an inverter input unit configured to receive an output signal from the previous inverter, to perform a predetermined delay operation and a logic operation on the received signal, and to output the operation result;

an inverter output unit configured to be controlled by output signals from the oscillation cycle selecting signal input unit and the inverter input unit, and to output a predetermined logic signal.

12. The generator of claim 11, wherein the oscillation cycle selecting signal input unit comprises:

an inverter means configured to invert the oscillation cycle selecting signal;

a NAND gate configured to NAND output signals from the inverter means and the previous inverter; and a NOR gate configured to NOR the oscillation cycle selecting signal and an output signal from the NAND gate.

13. The generator of claim 11, wherein the inverter input unit comprises:

a NAND gate configured to be controlled by a power voltage, and to invert an output signal from the previous inverter;

an inverter means configured to invert an output signal from the NAND gate; and a NOR gate configured to be controlled by a ground voltage, and to invert an output signal from the inverter means.

14. The generator of claim 11, wherein the inverter input unit comprises:

a first PMOS transistor configured to be controlled by an output signal from the oscillation cycle selecting signal input unit, and to output a high level signal if turned on;

a second PMOS transistor configured to be controlled by an output signal from the inverter input unit, and to output a high level signal if turned on; and a NMOS transistor configured to be controlled by an output signal from the inverter input unit, and to output a low level signal if turned on.

* * * * *